United States Patent
Kandukuri et al.

(10) Patent No.: US 9,703,634 B2
(45) Date of Patent: Jul. 11, 2017

(54) DATA RECOVERY FOR A COMPUTE NODE IN A HETEROGENEOUS DATABASE SYSTEM

(71) Applicant: Oracle International Corporation, Redwood Shores, CA (US)

(72) Inventors: Anantha Kiran Kandukuri, Zurich (CH); Sabina Petride, Tracy, CA (US)

(73) Assignee: Oracle International Corporation, Redwood Shores, CA (US)

( * ) Notice: Subject to any disclaimer, the term of this patent is extended or adjusted under 35 U.S.C. 154(b) by 82 days.

(21) Appl. No.: 14/675,497

(22) Filed: Mar. 31, 2015

(65) Prior Publication Data
US 2016/0292037 A1  Oct. 6, 2016

(51) Int. Cl.
G06F 11/00 (2006.01)
G06F 11/14 (2006.01)
G06F 11/20 (2006.01)
G06F 11/16 (2006.01)
G06F 17/30 (2006.01)

(52) U.S. Cl.
CPC ...... *G06F 11/1402* (2013.01); *G06F 11/1448* (2013.01); *G06F 11/1458* (2013.01); *G06F 11/1658* (2013.01); *G06F 11/2046* (2013.01); *G06F 17/30575* (2013.01); *G06F 2201/80* (2013.01)

(58) Field of Classification Search
CPC ............ G06F 11/2046; G06F 11/1458; G06F 11/1658; G06F 11/1448; G06F 11/1464; G06F 11/1662; G06F 11/0727
See application file for complete search history.

(56) References Cited

U.S. PATENT DOCUMENTS

| 7,200,623 | B2 | 4/2007 | Chandrasekaran | |
| 7,496,783 | B1* | 2/2009 | Graf | G06F 11/1456 714/13 |
| 8,484,163 | B1* | 7/2013 | Yucel | G06F 17/30289 370/216 |
| 9,021,296 | B1* | 4/2015 | Kiselev | G06F 11/2058 714/6.23 |
| 2004/0019821 | A1* | 1/2004 | Chu | G06F 11/2092 714/6.22 |
| 2004/0230691 | A1 | 11/2004 | Wookey | |

(Continued)

OTHER PUBLICATIONS

U.S. Appl. No. 14/675,490, filed Mar. 31, 2015, Notice of Allowance, Sep. 23, 2016.

*Primary Examiner* — Charles Ehne
(74) *Attorney, Agent, or Firm* — Hickman Palermo Becker Bingham LLP

(57) ABSTRACT

Data recovery for a compute node in a heterogeneous database system is provided. A failure is detected of a particular compute node of a compute cluster comprising a plurality of compute nodes. The compute cluster is configured to store, in memory, data stored by a RDBMS. Particular data of the data stored by the RDBMS is identified that is assigned to the particular compute node. The particular compute node is restored. After restoring the particular compute node, the particular data assigned to the particular compute node is reloaded without taking the particular data offline. During reloading, the particular compute node receives pending modified data comprising data of the particular data that was modified during said reloading.

27 Claims, 4 Drawing Sheets

(56) References Cited

U.S. PATENT DOCUMENTS

2012/0054533 A1   3/2012   Shi
2013/0042156 A1   2/2013   Srinivasan
2016/0292049 A1   10/2016  Kandukuri et al.

* cited by examiner

DATA RECOVERY FOR A COMPUTE NODE IN A HETEROGENEOUS DATABASE SYSTEM

CROSS-REFERENCE TO RELATED APPLICATIONS

This application is related to application Ser. No. 14/675,490, filed Mar. 31, 2015, entitled "Data Recovery For A Relational Database Management System Instance In A Heterogeneous Database System," the entire contents of which is hereby incorporated by reference as if fully set forth herein.

FIELD OF THE INVENTION

The present invention relates to database management systems and more particularly to data recovery for a compute node in a heterogeneous database system.

BACKGROUND

There has been emerging trend for accelerated databases where extreme database scalability is achieved by leveraging power of massively large number of computational nodes in efficient processing of analytical database workload. Such a system relies heavily on the data availability and correctness.

Data may be stored in a large cluster of nodes to take advantage of the aggregate memory and processing power of a large number of nodes. Clusters are available that operate on data that is stored in memory. Such clusters may lack persistent storage and access to transaction logs, and may relying instead on a traditional relational database management server (RDBMS) to be ACID (Atomicity, Consistency, Isolation, Durability) compliant, as expected in standard database systems. The cluster assists the RDBMS in processing the workload.

Failures, either in the RDBMS or the cluster, have a severe impact because they can lead to either data loss or data inconsistency. Several types of failure may affect transactional consistency. For example, when the RDBMS fails, change records used to maintain transactional consistency may be lost. When a node storing distributed data fails. Typically, to prevent inconsistencies, the data must be locked or otherwise made unavailable during reloading.

Existing change propagation methods for synchronizing data between a source and a destination include log-based methods and load-based methods. Log-based methods replay, at the destination, transactional log records for operations performed on the source. For example, the transactions may be re-executed and applied at the destination in the order in which the transactions occurred. Load-based methods periodically reload one or more tables from the source to the destination.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
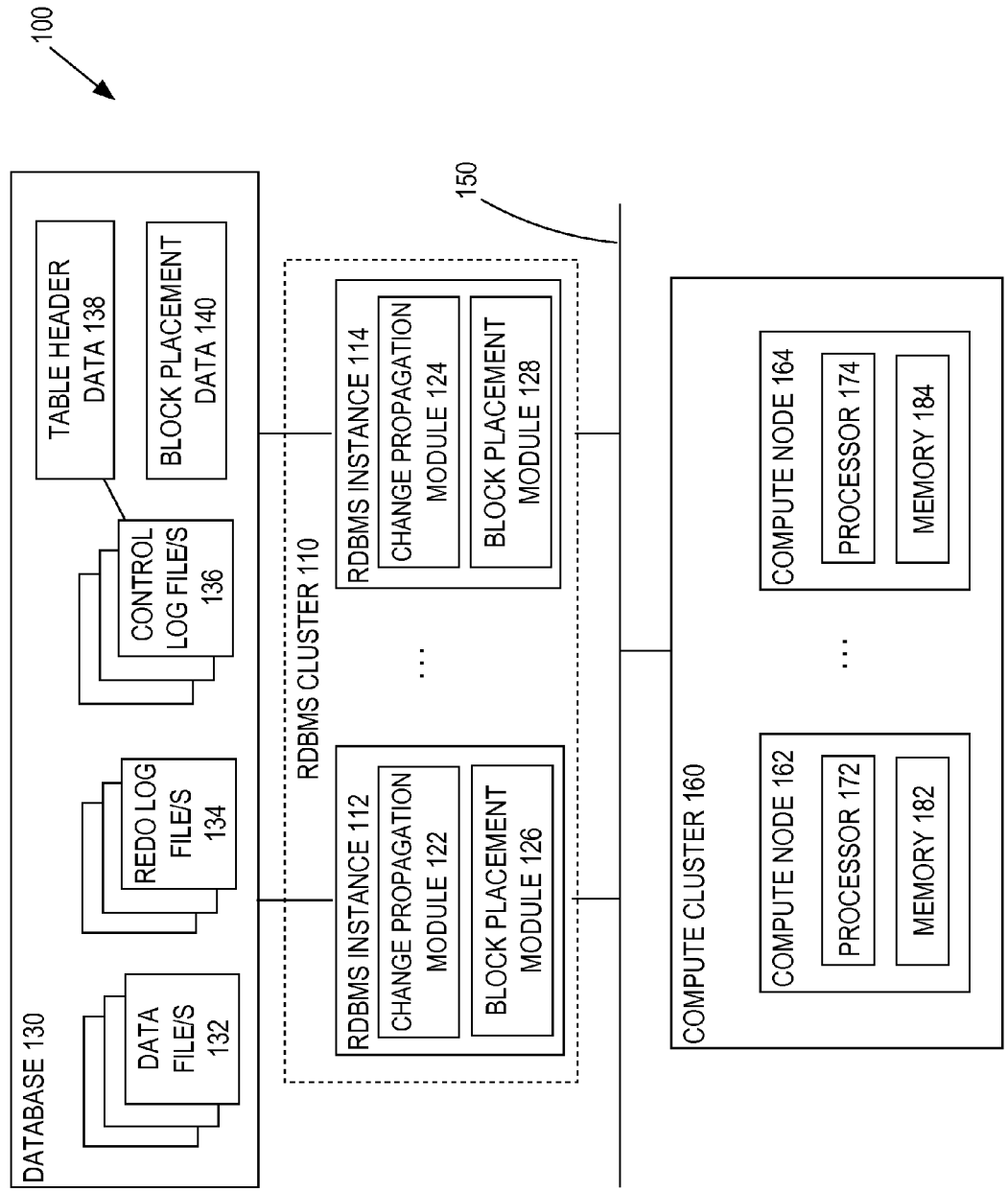
FIG. 1 is a block diagram depicting an embodiment of a heterogeneous database system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A heterogeneous database system includes a multi-instance relational database management system (RDBMS) that maintains a data set. The heterogeneous database system further includes a cluster of diskless compute nodes (hereafter the "compute cluster"). Each compute node caches or stores a subset of the data set. The compute cluster assists the multi-instance RDBMS in performing distributed compute operations. For example, one or more tables of the data set maintained by the RDBMS may be cached by the compute cluster such that the compute cluster may perform distributed compute operations involving the one or more cached tables.

Although the compute nodes may have some database functionality, the compute nodes of the cluster do not function as independent databases. For example, the compute cluster is not ACID compliant and relies on the RDBMS to respond to queries in a transactionally consistent manner. The RDBMS maintains transactional consistency by transmitting consistent copies of modified data blocks to the compute cluster, where the consistent copies are consistent with the version stored at the RDBMS as of a particular logical timestamp.

The compute cluster may hold multiple versions of a data block, allowing the compute cluster to compute queries with different timestamps. When an RDBMS instance or a compute node encounters a failure, transactional consistency may be affected. When data is unavailable or when transactional consistency cannot be guaranteed due to a failure, the compute cluster may not be used to assist the RDBMS in performing compute operations.

As used herein, the term "data recovery" refers to data synchronization between two or more heterogeneous database systems after a failure event, such as to restore transactional consistency. Data recovery may be performed with and/or as a part of instance recovery and node recovery. As used herein the term "instance recovery" refers to recovery of a failed RDBMS instance in a RDBMS cluster. As used herein the term "node recovery" refers to recovery of a node in a cluster, such as a compute node in a compute cluster.

One or more techniques described herein are directed to data recovery after a compute node failure in a compute cluster. In the case of a failure of a compute node, the subset of data loaded into the failed compute node is lost. The compute cluster cannot be used to process queries until the missing data is restored. To recover from a failure of a compute node, data blocks hosted by the failed compute node are identified and reloaded using header information maintained for each table and lightweight block placement information for the cluster. The header information includes identifies the blocks of the table. This brings the compute node up to date as of the beginning of the data recovery process. However, ongoing transactional changes are still processed in the RDBMS. These changes are transmitted from the RDBMS, and may be transmitted during reloading. The changes are processed after the reload is complete. This brings the node up to date with online changes during data recovery. This solution allows for online reloading of the compute node data without locking the RDBMS.

System Overview

An example architecture is described for a heterogeneous system comprising a cluster of RDBMS instances assisted by a compute cluster. FIG. 1 is a block diagram depicting an embodiment of a heterogeneous database system. Heterogeneous database system 100 includes RDBMS cluster 110 and compute cluster 160. Compute cluster 160 assists RDBMS cluster 110 to perform distributed compute operations. Although the compute nodes may have some database functionality, the compute nodes of the cluster do not function as independent databases. The compute cluster, the RDBMS cluster, and their interactions shall be described in greater detail hereafter.

RDBMS Cluster

RDBMS cluster 110 includes a plurality of RDBMS instances 112-114. RDBMS instances 112-114 are configured to access database 130. In one embodiment, RDBMS cluster 110 is a shared-disk database system, and RDBMS instances 112-114 are each configured to access database 130. One example of a shared-disk database system is the Oracle Real Application Clusters (RAC). Oracle RAC includes multiple servers or hosts connected to each other by a high bandwidth, low latency interconnect, such as communication infrastructure 150. For example, communication infrastructure 150 may comprise one or more networks, links, communication buses, communication fabrics, or any other communication infrastructure over which communication can be established between one or more components of heterogeneous database system 100 and one/or one or more clients thereof. In one embodiment, communication infrastructure 150 is a private network that connects RDBMS instances 112-114.

Each RDBMS instance 112-114 provides same the access and functionality to the entire data set stored in database 130. Database 130 comprises one or more data files 132, and one or more REDO log files 134, and one or more control files 136. Data files 132, and REDO log files 134, and control files 136 are shared between RDBMS instances 112-114 of RDBMS cluster 110. Data stored in database 130 is persisted in one or more data files 132. Data files 132 may be stored over one or more storage devices, such as one or more storage disks. In one embodiment, data files 132 are stored as one or more blocks over the storage device.

Redo Records

REDO log file/s 134 store data and metadata describing changes made to the database. REDO log files 134 may include individual REDO records that each correspond to a set of one or more changes to database 130. A REDO record includes data and/or metadata related to modifications performed on database 130. For example, a REDO record may specify one or more data block(s) being modified and their respective values before and after each database change. In one embodiment, REDO records are generated and stored in REDO log files 134 as changes are made to database 130. In one embodiment, the REDO records are ordered in time using a shared logical clock service that assigns a logical timestamp to each REDO record. As used herein, the term "logical timestamp" includes any data usable to uniquely identify an order between any two logical timestamps. A logical timestamp may be based on an actual time, an order, or any other data usable to indicate an order.

A logical timestamp may be associated with a REDO record, as well as any other event or point in the logical time space. For example, a failure event or a recovery event may occur at a point in the logical time space, and the order of such an event may be compared with a logical timestamp associated with REDO record. An example of a logical timestamp is a system change number (SCN) generated by a shared logical clock service in the Oracle RAC database system. A logical timestamp may be included in one or more REDO records and/or headers or other metadata. In one embodiment, the logical timestamp associated with a particular REDO record is also associated with the data block modified by the change recorded in the particular REDO record.

In one embodiment, REDO log files 134 include REDO records that are usable to reconstruct all changes made to database 130. For example, if a change to database 130 needs to be undone, such as when a transaction is not committed, one or more REDO records may be processed to undo the corresponding change. If a data file needs to be restored, a backup of the data file can be loaded, and one or more REDO records may be processed to replay changes made to database 130 since a time associated with the backup.

REDO log files 134 may be shared between one or more RDBMS instances 112-114. Alternatively and/or in addition, an RDBMS instance 112-114 may maintain one or more dedicated REDO log files 134. In one embodiment, RDBMS instances 112-114 write REDO records in blocks that are stored in database 130 such that each REDO record block corresponds to a particular RDBMS instance 112-114. Each RDBMS instance 112-114 may buffer REDO records locally and flush the buffered REDO records to REDO log files 134 when transactions are committed.

Control File

Control file/s 136 include data regarding the status and/or physical structure of database 130. For example, control file/s 136 file may include a database name, names and locations of associated data files, logical timestamp information associated with the creation of the database, a current logical timestamp for the database, and checkpoint information for the database. In one embodiment, control file/s 136 include table header data 138. For a particular table stored in database 130, table header data 138 identifies data blocks in database 130 that belong to a particular table.

Block Placement Module

In one embodiment, RDBMS cluster 110 and/or database 130 includes a block placement system comprising block placement modules 126-128. As shown, block placement module 126-128 is distributed. However, a block placement system may be implemented as a centralized system. Block placement module 126-128 uses a lightweight mapping system to determine a particular compute cluster to assign a particular data block. For example, the lightweight mapping system may map a particular data block to a particular compute node based on an identifier for the particular data block or other data associated with the particular data block. For example, the lightweight mapping system may use a mapping function, such as a hashing algorithm. In one embodiment, the mapping function is selected to distribute the data blocks evenly and/or to co-locate data with respect to tables that are related by a key.

RDBMS instances 112-114 may use block placement module 126-128 to determine which compute node of compute cluster 160 should cache a particular data block of a cached table. In one embodiment, the block placement module 126-128 uses a default mapping function to assign data blocks to compute nodes within compute cluster 160. When a particular data block is cached in a particular compute node in accordance with the default mapping function, then it is not necessary to store additional mapping data for the particular data block. In one embodiment, one or more data blocks are cached on a different compute node rather than following the default mapping function. For example, the different compute node may be necessary due to the inaccessibility of the default compute node indicated by the default mapping function, due to memory constraints of the default compute node, due to an optimization, or due to any other factor. When the default mapping function is not followed, the association between the particular data block and the alternative compute node is stored as block placement data 140. For example, when a default mapping function is used by block placement module 126-128, block placement data 140 comprises one or more exception mappings from data blocks to alternative compute nodes where the default mapping function was not followed. Thus, block placement module 126-128 may identify the location of any cached data block based on the default mapping function and block placement data 140.

Compute Cluster

Compute cluster 160 includes a plurality of compute nodes 162-164. Compute cluster 160 assists RDBMS instances 112-114 of RDBMS cluster 110 by performing distributed compute operations on one or more cached tables. In one embodiment, compute cluster 160 is massively parallel. For example, the number of compute nodes 162-164 in compute cluster 160 may be at least two orders of magnitude greater than the number of RDBMS instances 112-114 in RDBMS cluster 110. The massively parallel system has a high amount of aggregate memory 182-184 and processing resources.

Compute nodes 162-164 may each comprise one or more power-efficient processors 172-174. A power-efficient processor is a lower power processor that optimizes for efficiency rather than maximizing speed. In one embodiment, processors 172-714 comprise hardware infrastructure that is optimized for efficient processing of an analytical database workload. In one embodiment, compute nodes 162-164 do not have persistent storage. Compute nodes 162-164 cache one or more tables of database 130 by storing a portion of the one or more tables in memory 182-184.

Although compute nodes 162-164 may have some database functionality, compute nodes 162-164 of compute cluster 160 do not function as independent databases. For example, when compute nodes 162-164 do not have non-volatile storage, the compute nodes 162-164 do not store data durably. Furthermore, because the compute cluster cannot persistently store REDO logs, it cannot maintain transactional consistency when assisting the RDBMS to process queries. Although compute cluster 160 may assist RDBMS cluster 110 in performing computations to respond to a query, RDBMS cluster 110 maintains transactional consistency and responds to the queries in a transactionally consistent manner.

In one embodiment, compute cluster 160 coordinates with one or more RDBMS instances 112-114 to execute queries if it is determined or estimated that executing the query with the assistance of compute cluster 160 is more efficient than in the executing the query in the RDBMS alone. Executing the query with the assistance of compute cluster 160 may be transparent to the client that submitted the query to an RDBMS instance 112-114 of the RDBMS.

To coordinate conflicting data accesses and system management activities, compute cluster 160 uses may use an inter-node communication infrastructure, which may be similar to, same as, distinct from, and/or overlapping with communication infrastructure 150.

Change Propagation

Data stored in database 130 is modified by RDBMS instances 112-114 when RDBMS instances 112-114 handle data manipulation transactions. In order for compute cluster 160 to assist RDBMS cluster while maintaining transactional semantics, the modified data should be reflected in the cached data in the compute cluster 160. Heterogeneous system 100 is designed to provide transactionally consistent query execution. Therefore, every query executed with the assistance of compute cluster 160 is guaranteed to transactionally consistent with respect to a logical time associated with the query. In order to guarantee transactional consistency, data blocks stored in memory 182-184 need to be refreshed with changes to database 130.

RDBMS instances 112-114 of RDBMS cluster 110 are configured to transmit copies of changed data blocks to compute cluster 160. In one embodiment, RDBMS instances 112 include change propagation modules 122-124 (also referred to collectively as the "change propagation system"). Change propagation module 122-124 synchronizes data stored in memory 182-184 in compute cluster 160 with the database 130. Change propagation modules 122-124 monitor database 130 for data changes. For example, a change propagation module 122-124 deployed on an RDBMS instance 112-114 may monitor changes to database 130 by the corresponding RDBMS instance 122-124.

In one embodiment, change propagation module 122-124 works at the granularity of a data block stored in database 130. Change propagation module 122-124 identifies changed database blocks and transfers consistent read copies of the changed database blocks to the compute cluster 160. The a particular changed data block will be updated at one or more compute nodes 162-164 that store the particular changed data block in memory 182-174. In one embodiment, compute cluster 160 may store multiple versions of data blocks in memory 182-184, allowing compute cluster 160 to compute queries with different logical timestamps.

Cluster Node Failure

Techniques are described hereafter for data recovery on a failed compute node. In one embodiment, compute cluster 160 does not have disk support to maintain persistent data. When a compute node fails, the subset of data loaded on the failed compute node is lost. Until the missing data subset is restored, compute cluster 160 cannot be used to process queries involving the missing data subset. Data recovery must restore transactionally consistent data, particularly if the RDBMS cluster 110 is still able to modify the data set at database 130. After data recovery, compute cluster 160 can once again able to execute all queries on tables stored by compute cluster 160.

When compute cluster 160 is massively parallel, a small missing subset of data on a failed compute node can prevent a large number of queries from being executed with the assistance of compute cluster 160. Furthermore, when compute cluster 160 is massively parallel, node failures are statistically expected to happen more frequently. Thus, any downtime that is incurred to recover a node will be incurred with greater frequently in a compute cluster 160 with more nodes. Thus, the minimization of compute cluster 160 downtime to recover a failed node is important for scalability.

Node Recovery

The restoring or replacement of a failed compute node is referred to as "node recovery." Node recovery comprises restoring the failed compute node or setting up a replacement compute node that acts in place of the failed compute node. For example, compute cluster 160 may include a failover mechanism that quickly detects a compute node failure and substitutes another compute node to replace the failed compute node. As used herein, the term "restored compute node" refers to either a replacement compute node or the original compute node after repair. In one embodiment, one or more steps for data recovery on a restored compute node depends on the completion of node recovery, as shall be described in greater detail hereafter.

In one embodiment, node recovery is complete when the restored compute node rejoins compute cluster 160 and is accessible by RDBMS cluster 110. Even after node recovery, data recovery must be performed on the restored compute node to make the restored compute node a functional member of compute cluster 160. The restored compute node should store, in memory, data that is transactionally consistent with one or more tables stored in database 130. Specifically, the RDBMS cluster 110 may remain online and make changes to a data set cached by compute cluster 160, even when compute cluster 160 is undergoing node recovery or data recovery. Thus, the restored compute node should include the data stored at the failed compute node before failure as well as any subsequent changes at database 130 made by the RDBMS cluster 110.

Data Recovery

Figure 2:
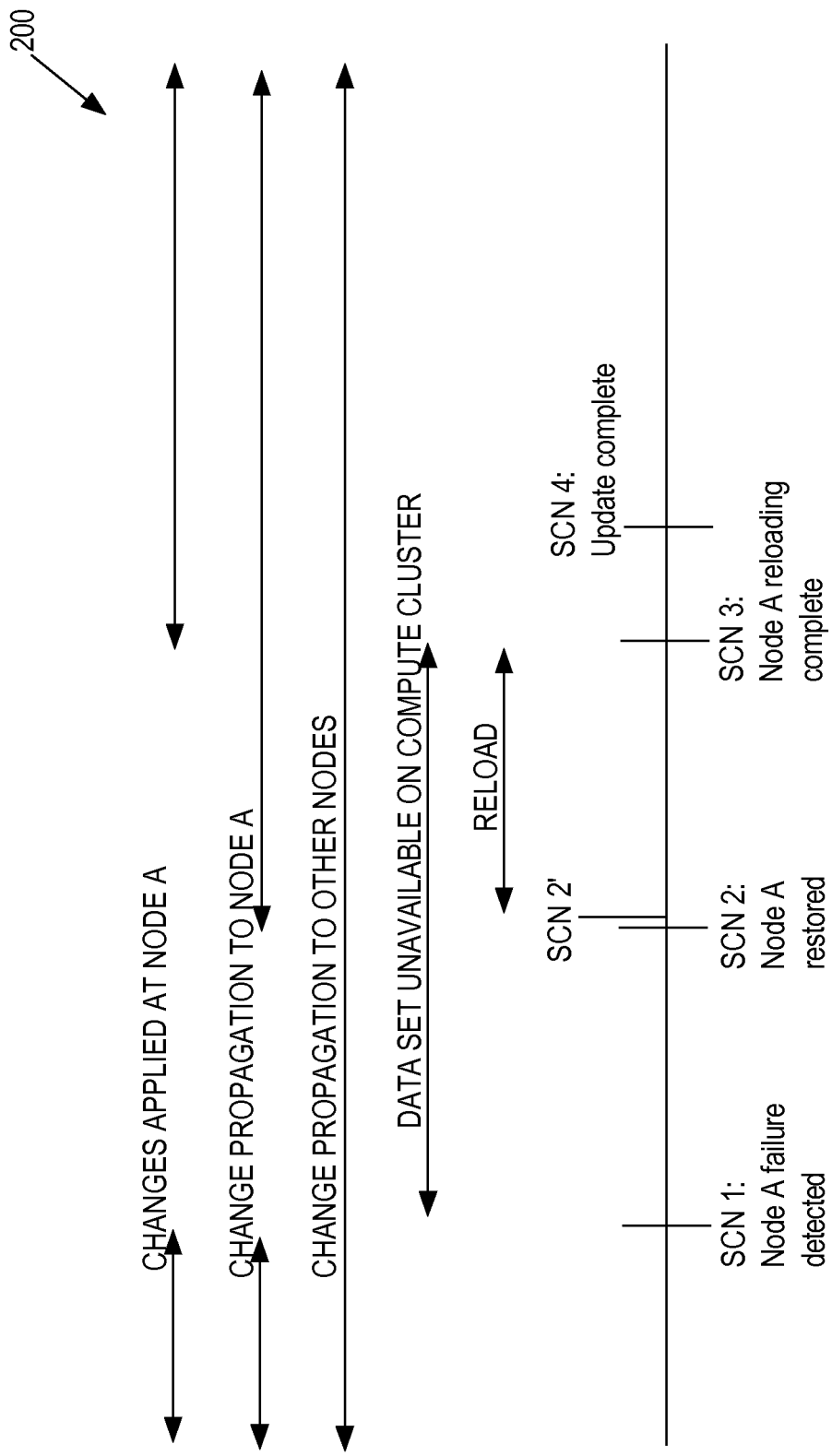
FIG. 2 depicts a timeline of an embodiment of a recovery process for a failed compute node.

FIG. 2 depicts a timeline of an embodiment of a recovery process for a failed compute node. The embodiment describes synchronization of node recovery and data recovery in a manner that does not require locking the cached data set or otherwise taking the cached data set offline in the database maintained by the RDBMS cluster. The solution for data recovery presented herein does not depend on any state information present in compute cluster 160, and works independently of any particular node failure in compute cluster 160.

Node A is a failed compute node in compute cluster 160. A change propagation system of the RDBMS cluster 110 continuously propagates changes to the compute nodes 162-164 of the compute cluster 160 that caches or otherwise stores a distributed data set that is stored in database 130.

At SCN 1, the failure of Node A is detected. The subset of the data set that is loaded on Node A is lost, and compute cluster 160 cannot be used to process queries involving the missing data subset until both node recovery and data recovery are performed for Node A. For example, database operations that require access to the entire data set, including the subset previously loaded on Node A, must be fully performed by the RDBMS cluster 110 (i.e. without the assistance of the compute cluster 160).

In response to the detection of the failure of Node A, node recovery of Node A is performed, such as restoring Node A or setting up a replacement compute node that acts in place of Node A. At SCN 2, the restoration of Node A, or node recovery, is complete. In one embodiment, node recovery is performed based on a failover mechanism that quickly replaces Node A.

In one embodiment, based on the detection of the failure, the change propagation system of RDBMS cluster stops tracking and sending changes corresponding to data blocks assigned to the failed compute node. For example, the RDBMS instances 112-114 may be notified, and may stop transmitting the changed data blocks to failed Node A via change propagation modules 122-124, but may continue transmitting changed data blocks to the remaining compute nodes of compute cluster 160.

At SCN 2, Node A does not store any data because the data previously loaded on Node A was lost due to the failure of Node A, including any updates propagated to Node A by the change propagation system. Once restored Node A is available, a transactionally consistent image of the proper subset of data may be reloaded onto Node A. For example, the image of the proper subset of data loaded onto Node A may be transactionally consistent as of SCN 2', which may be equal to SCN 2 or after, and corresponds with a logical timestamp on or after completion of node recovery of Node A. The subset to be loaded onto restored Node A shall be referred to as the SCN 2' image data subset. The reloading phase for the SCN 2' image data subset shall be described in greater detail hereafter. Because RDBMS cluster 110 is still online, RDBMS instances 112-114 may still make changes to the data set at database 130, even after initiating loading of the data subset image that is transactionally consistent as of SCN 2'.

At SCN 3, loading of the SCN 2' image data subset to Node A is complete. However, the SCN 2' image data subset is potentially not current because RDBMS cluster 110 may have made changes to the data subset between SCN 2' and SCN 3. To address this issue, the change propagation system resumes communication with restored Node A at SCN 2, even though data recovery of Node A is not complete. The operation of the change propagation system throughout the process of detecting and repairing Node A shall be described in greater detail hereafter.

In one embodiment, data recovery of Node A is considered complete at SCN 3 after completion of loading of the SCN 2' image data subset to Node A. Compute cluster 160 is unavailable to assist RDBMS cluster 110 between SCN 1 and SCN 3. In one embodiment, the changes received at Node A from the change propagation system are applied after SCN 3, i.e. after the SCN 2' image data subset reloading is complete. Because change propagation is an ongoing process to synchronize the cached data set at compute cluster 160 and at database 130 as maintained by RDBMS cluster 110, these changes are handled in the normal process of operation of Node A. Transactional consistency is managed by RDBMS cluster 110 in the normal process of operation of the RDBMS instances 112-114 thereof.

In another embodiment, data recovery of Node A is not considered complete until SCN 4, when the changes received at Node A are applied to the local subset of data at Node A. In one embodiment, between SCN 3 and SCN 4, Node A is ready to participate in queries that require data up to SCN 2', but will not participate in queries that require changes between SCN 2' and SCN 3.

Identification Phase

To restore the missing data subset on a restored node or a replacement node after failure, the set of data blocks those were hosted by the failed compute node must be identified. In one embodiment, when the data set cached by the compute cluster comprises one or more tables stored in the database, the data blocks are identified by using table header data 138. For a particular table stored in database 130, table header data 138 identifies data blocks in database 130 that belong to a particular table. For clarity of description, the handling of one table shall be described. When the data set includes multiple tables, the reloading phase is performed for each table, and, for a particular table, any part of the identification phase or another phase of data recovery may be performed in any sequence with respect to any other table.

In one embodiment, the table header data 138 includes or identifies an allocation map for each table, which may be used to retrieve identifiers for each data block of the table. To determine which data blocks of the table are assigned to the failed compute node, block placement data 140 is used. In one embodiment, blocks are placed in accordance with a block placement system that uses a default mapping function to assign data blocks to compute nodes within the cluster. When the default mapping function is not followed for a particular data block, the particular data block is assigned to an alternative compute node, and the association between the particular data block and the alternative compute node is stored in block placement data 140. Thus, the combination of the default mapping function and block placement data 140 may be used to determine all the data blocks assigned to the failed compute node. In one embodiment, the default mapping function is used to determine a node to which a data block is assigned after checking the block placement data 140 for an entry indicating that the default mapping function was not followed.

In one embodiment, the identification of the data blocks is determined during compute node recovery. For example, in FIG. 2, the identification phase may be performed for Node A as early as SCN 1. In one embodiment, the identification phase is performed by one or more RDBMS instances 112-114 or by one or more other computing resources with access to database 130. For example, the allocation mapping may be performed in a distributed manner by multiple RDBMS instances 112-114 or by other distributed computing resources of heterogeneous database system 100.

Reload Phase

In the reload phase, data blocks of the data subset assigned to a failed compute node are reloaded to the restored data node. With respect to FIG. 2, the reload phase for restored Node A occurs from SCN 2' to SCN 3. The SCN 2' image data subset is loaded onto restored Node A. The SCN 2' image data subset includes data blocks that were present on failed Node A at the time of failure, SCN 1, and may include later versions thereof.

For each data block, a consistent read copy of the data block that is consistent with SCN 2' is obtained from database 130 and transmitted to Node A. In one embodiment, the consistent read copy is obtained from a standby, a cache, a log such as a REDO log, or any other copy of the data that is current as of SCN 2'. When every data block identified as assigned to Node A is transmitted and acknowledged successfully, the reload phase is complete.

SCN 2' is a reload-start-timestamp and is used to track and ensure the transactional consistency of the reloaded data blocks with respect to each other. In one embodiment, SCN 2' is based on a start time of the reload phase. Alternatively, SCN 2' may be any logical timestamp that occurs after a logical time stamp corresponding to the completion of compute node recovery for Node A. The update phase, described in greater detail hereafter, may be based on the reload-start-timestamp, or SCN 2', thereby ensuring that all changes are propagated.

Update Phase

The update phase refers to the point at which a restored compute node begins to receive modified data blocks from the change propagation system of RDBMS cluster 110. In one embodiment, modified data blocks with a logical timestamp occurring after the reload-start-timestamp are propagated to the restored compute node. In one embodiment, the reload-start-timestamp occurs after node recovery is complete, and the change propagation modules 122-124 of RDBMS instances 112-114 propagate modified data blocks to the restored compute node in accordance with their normal process of operation.

Example Data Recovery Process for a Failed Compute Node

Figure 3:
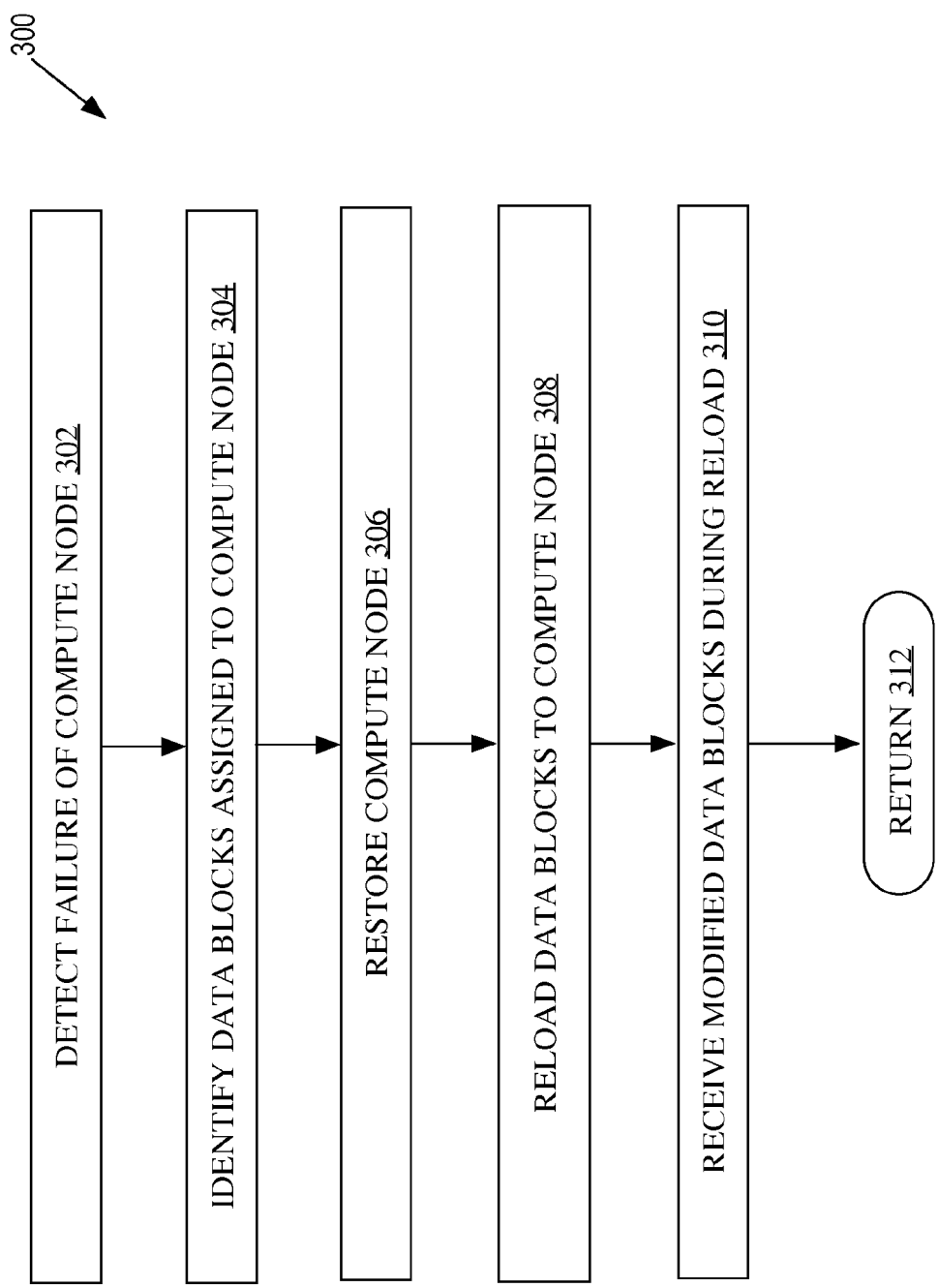
FIG. 3 depicts an embodiment of a method for recovering a failed compute node.

FIG. 3 depicts an embodiment of a method for recovering a failed compute node. Process 300 may be performed by one or more computing devices and/or processes thereof. For example, one or more blocks of process 300 may be performed by computer system 400. In one embodiment, one or more blocks of process 300 are performed by one or more compute nodes of compute cluster 160 and/or one or more RDBMS instances of RDBMS cluster 110.

At block 302, a failure of a compute node is detected. The detection of the failure may occur in compute cluster 160, RDBMS cluster 110, or another component of heterogeneous database system 100. In one embodiment, node recovery of the failed compute node is initiated after detection of the failure.

At block 304, data blocks assigned to the failed compute node are identified. In one embodiment, the data blocks are identified based on table header data 138, a default mapping function and block placement data 140 for data blocks that were not placed in accordance with the default mapping function. In one embodiment, identification of the data blocks is initiated after detection of the failure of the compute node, and may be performed concurrently with node recovery. In one embodiment, identification of the data blocks may be performed in a distributed manner. The identification of the data blocks may be performed by one or more RDBMS instances of RDBMS cluster 110 or another component of heterogeneous database system 100.

At block 306, the failed compute node is restored. For example, the failed compute node may be restored by fixing the failed compute node or setting up a replacement compute node that acts in place of the failed compute node. In one embodiment, the node recovery is complete when the restored compute node rejoins the compute cluster and is accessible by RDBMS cluster 110.

At block 308, the identified data blocks are reloaded to the restored compute node. In one embodiment, the reloaded data blocks are transactionally consistent with a logical timestamp occurring after the compute node is restored and accessible by RDBMS cluster 110.

At block 310, modified data blocks are received at the restored compute node during the reloading process. The modified data blocks are transmitted from a change propagation system of the RDBMS cluster 110, such as one or more change propagation modules 122-124 of one or more RDBMS instances 112-114 that have changed data blocks in database 130 that belong to the subset assigned to the compute node. In one embodiment, the modified data blocks are processed by the compute node only after reloading is complete. In another embodiment, the modified data blocks are processed by the compute node even during reload.

At block 312, process 300 returns and/or terminates. For example, processing may continue to passing control to a calling process, generating any appropriate record or notification, returning after a method or function invocation, or terminating.

Database System Examples

Embodiments of the present invention are used in the context of database management systems (DBMSs). Therefore, a description of an example DBMS is provided.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A query is a database command that includes request for information from the database that returns a record set, which may be an empty record set. A query is typically submitted as a statement in a query language that is interpreted by a database server to cause one or more database operations.

One database language for expressing the database commands is the Structured Query Language (SQL). There are many different versions of SQL, some versions are standard and some proprietary, and there are a variety of extensions. Data definition language ("DDL") commands are issued to a DBMS to create or configure database objects, such as tables, views, or complex data types. SQL/XML is a common extension of SQL used when manipulating XML data in an object-relational database. Data manipulation language ("DML") instructions are issued to a DBMS to manage data stored within a database structure. For instance, SELECT, INSERT, UPDATE, and DELETE are common examples of DML instructions found in some SQL implementations.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Implementation System Examples

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
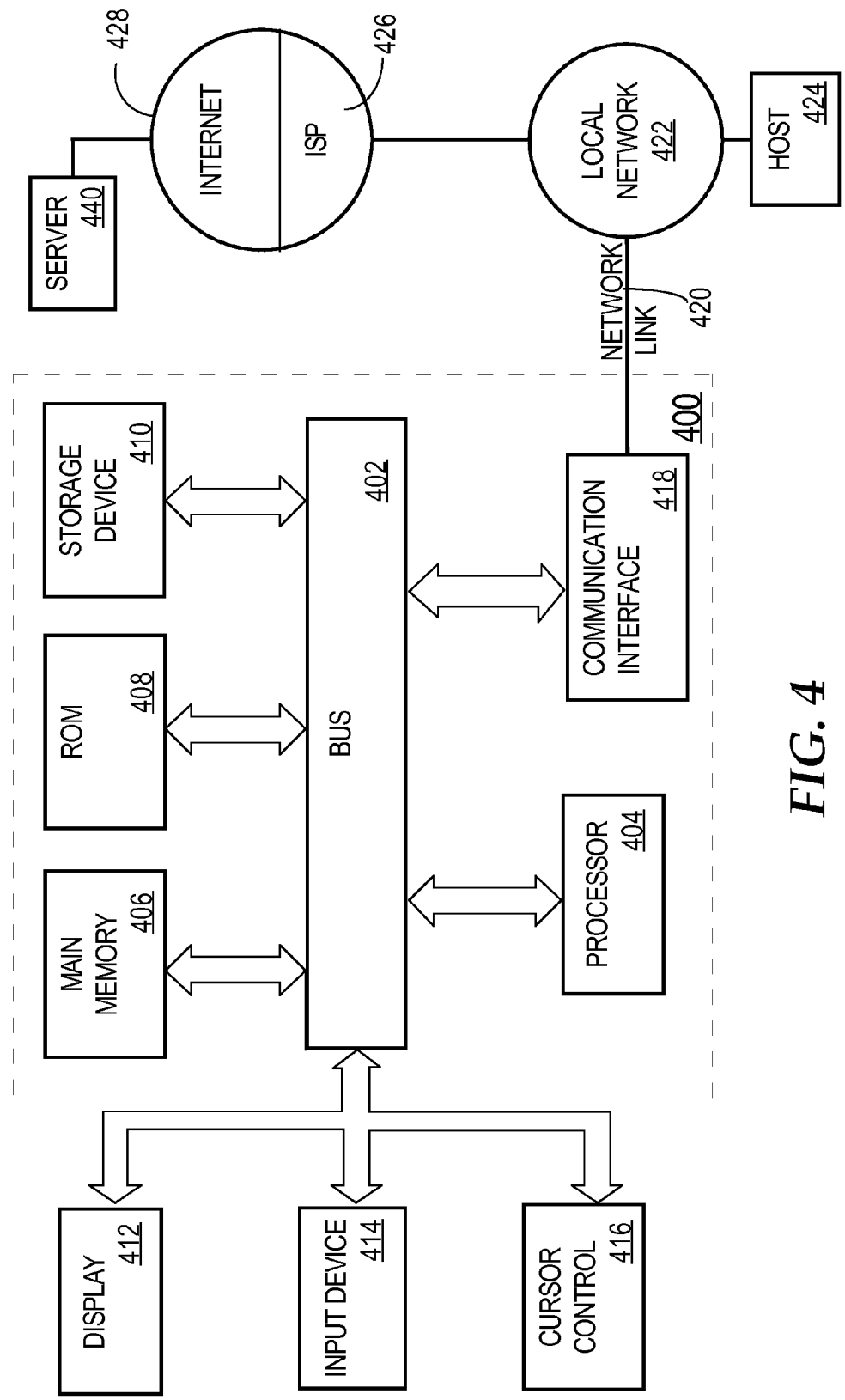
FIG. 4 depicts a computer system upon which one or more embodiments may be implemented.

For example, FIG. 4 is a block diagram that depicts a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   detecting a failure of a particular compute node of a compute cluster comprising a plurality of compute nodes;
   wherein the compute cluster is configured to store, in memory, data stored by a relational database management system (RDBMS);
   identifying particular data of the data stored by the RDBMS that is assigned to the particular compute node;
   restoring the particular compute node;
   after restoring the particular compute node, reloading, from the RDBMS to the particular compute node, the particular data assigned to the particular compute node without taking the particular data offline; and
   during said reloading, receiving by the particular compute node, pending modified data comprising data of the particular data that was modified during said reloading;
   wherein the method is performed by one or more computing devices.

2. The method of claim 1, wherein the received pending modified data is not processed by the particular compute node until after said reloading is complete.

3. The method of claim 1, wherein the particular data that is reloaded is transactionally consistent as of a reload-start-timestamp that occurs after the particular compute node is restored.

4. The method of claim 1, wherein said identifying and said restoring are performed concurrently.

5. The method of claim 1, wherein the RDBMS is a shared-disk RDBMS cluster.

6. The method of claim 5, wherein one or more RDBMS instances of the shared-disk RDBMS cluster have write access to the particular data during said reloading.

7. The method of claim 5, wherein the pending modified data received by the particular compute node is received from one or more change propagation modules of one or more RDBMS instances of the shared-disk RDBMS cluster.

8. The method of claim 5, wherein said identifying and said reloading are performed by one or more RDBMS instances of the shared-disk RDBMS cluster.

9. The method of claim 1,
wherein the compute cluster is configured to store a plurality of data blocks corresponding to data blocks stored by the RDBMS; and
wherein the particular data assigned to the particular compute node comprises one or more particular data blocks of the data blocks stored by the RDBMS.

10. The method of claim 9, wherein identifying the one or more particular data blocks assigned to the particular compute node is based on a default placement function and block placement data maintained by the RDBMS for at least a portion of the plurality of data blocks.

11. The method of claim 1 wherein:
the RDBMS comprises a plurality of RDBMS instances;
the number of compute nodes in the plurality of compute nodes exceeds the number of RDBMS instances in the plurality of RDBMS instances.

12. The method of claim 1 wherein a relational table comprises the particular data.

13. The method of claim 1 further comprising:
the RDBMS receiving a database query;
the RDBMS detecting, based on the database query, whether or not the compute cluster can accelerate execution of the database query.

14. The method of claim 1 wherein reloading, from the RDBMS to the particular compute node, the particular data comprises at least one of:
transferring the particular data on a computer network;
retrieving the particular data from at least one of: a standby database instance, a cache, a redo log, or a log file.

15. The method of claim 1 wherein the RDBMS provides, for the particular data, transactional consistency that is Atomicity, Consistency, Isolation, Durability (ACID) compliant.

16. The method of claim 3 wherein:
the RDBMS comprises a plurality of RDBMS instances;
the method further comprises generating the reload-start-timestamp by a clock service that is shared by the plurality of RDBMS instances.

17. The method of claim 3 wherein the reload-start-timestamp does not comprise an actual time.

18. One or more non-transitory storage media storing instructions which, when executed by one or more computing devices, cause:
detecting a failure of a particular compute node of a compute cluster comprising a plurality of compute nodes;
wherein the compute cluster is configured to store, in memory, data stored by a relational database management system (RDBMS);
identifying particular data of the data stored by the RDBMS that is assigned to the particular compute node;
restoring the particular compute node;
after restoring the particular compute node, reloading, from the RDBMS to the particular compute node, the particular data assigned to the particular compute node without taking the particular data offline; and
during said reloading, receiving by the particular compute node, pending modified data comprising data of the particular data that was modified during said reloading.

19. The one or more non-transitory storage media of claim 18, wherein the received pending modified data is not processed by the particular compute node until after said reloading is complete.

20. The one or more non-transitory storage media of claim 18, wherein the particular data that is reloaded is transactionally consistent as of a reload-start-timestamp that occurs after the particular compute node isrestored.

21. The one or more non-transitory storage media of claim 18, wherein said identifying and saidrestoring are performed concurrently.

22. The one or more non-transitory storage media of claim 18, wherein the RDBMS is a shared-disk RDBMS cluster.

23. The one or more non-transitory storage media of claim 22, wherein one or more RDBMS instances of the shared-disk RDBMS cluster have write access to the particular data during said reloading.

24. The one or more non-transitory storage media of claim 22, wherein the pending modified data received by the particular compute node is received from one or more change propagation modules of one or more RDBMS instances of the shared-disk RDBMS cluster.

25. The one or more non-transitory storage media of claim 22, wherein said identifying and said reloading are performed by one or more RDBMS instances of the shared-disk RDBMS cluster.

26. The one or more non-transitory storage media of claim 18,
wherein the compute cluster is configured to store a plurality of data blocks corresponding to data blocks stored by the RDBMS; and
wherein the particular data assigned to the particular compute node comprises one or more particular data blocks of the data blocks stored by the RDBMS.

27. The one or more non-transitory storage media of claim 26, wherein identifying the one or more particular data blocks assigned to the particular compute node is based on a default placement function and block placement data maintained by the RDBMS for at least a portion of the plurality of datablocks.

* * * * *

UNITED STATES PATENT AND TRADEMARK OFFICE
CERTIFICATE OF CORRECTION

PATENT NO. : 9,703,634 B2  
APPLICATION NO. : 14/675497  
DATED : July 11, 2017  
INVENTOR(S) : Kandukuri et al.

Page 1 of 1

It is certified that error appears in the above-identified patent and that said Letters Patent is hereby corrected as shown below:

In the Specification

In Column 6, Line 41, delete "The a" and insert -- The --, therefor.

In the Claims

In Column 16, Line 21, in Claim 20, delete "isrestored." and insert -- is restored. --, therefor.

In Column 16, Line 23, in Claim 21, delete "saidrestoring" and insert -- said restoring --, therefor.

In Column 16, Line 53, in Claim 27, delete "datablocks." and insert -- data blocks. --, therefor.

Signed and Sealed this  
Thirteenth Day of February, 2018

Andrei Iancu  
*Director of the United States Patent and Trademark Office*